(12) United States Patent
Meadow et al.

(10) Patent No.: US 7,069,250 B2
(45) Date of Patent: Jun. 27, 2006

(54) CHECK BASED ONLINE PAYMENT AND VERIFICATION SYSTEM AND METHOD

(75) Inventors: William D. Meadow, Jacksonville, FL (US); Randall A. Gordie, Jr., Jacksonville, FL (US); Sanjay P. Ahuja, Ponte Vedra Beach, FL (US)

(73) Assignee: Payformance Corporation, Jacksonville, FL (US)

( * ) Notice: Subject to any disclaimer, the term of this patent is extended or adjusted under 35 U.S.C. 154(b) by 592 days.

(21) Appl. No.: 09/976,056

(22) Filed: Oct. 15, 2001

(65) Prior Publication Data

US 2003/0074327 A1    Apr. 17, 2003

(51) Int. Cl.
*G06F 17/60* (2006.01)

(52) U.S. Cl. ............ 705/75; 705/1; 705/62; 705/64; 705/67; 380/54; 713/168; 713/176; 713/179

(58) Field of Classification Search ........ 705/75, 705/35, 1, 64, 62, 67; 380/54; 713/176, 713/168, 179
See application file for complete search history.

(56) References Cited

U.S. PATENT DOCUMENTS

| 4,023,013 | A |   | 5/1977  | Kinker ............... 235/61.7 |
| 4,498,000 | A |   | 2/1985  | Decavele et al. ....... 235/380 |
| 5,163,098 | A |   | 11/1992 | Dahbura .............. 380/24   |
| 5,455,407 | A | * | 10/1995 | Rosen ................ 705/69   |
| 5,485,510 | A |   | 1/1996  | Colbert .............. 379/145  |
| 5,826,245 | A |   | 10/1998 | Sandberg-Diment ...... 705/44   |
| 5,870,473 | A |   | 2/1999  | Boesch et al.                  |
| 6,000,832 | A |   | 12/1999 | Franklin et al. ...... 364/479.02 |
| 6,012,144 | A |   | 1/2000  | Pickett .............. 713/201  |
| 6,023,682 | A |   | 2/2000  | Checchio ............. 705/18   |
| 6,029,154 | A |   | 2/2000  | Pettitt .............. 705/44   |
| 6,078,902 | A |   | 6/2000  | Schenkler ............ 705/35   |

(Continued)

FOREIGN PATENT DOCUMENTS

JP          11085881      *  11/1997

OTHER PUBLICATIONS

Automatic storage, retrieval and vizualization of bank check images; HTTP:pdos.csail.mit.edu/chord/papers/sec.pdf (data unknown).*

(Continued)

*Primary Examiner*—James P. Trammell
*Assistant Examiner*—John M. Winter
(74) *Attorney, Agent, or Firm*—Foley & Lardner LLP

(57) ABSTRACT

A method and system for verifying a check that is being used for an on-line transaction, utilizes a hash code value either printed directly on the check, or obtained from an insert card provided by a check printer. To conduct an on-line transaction using a check, the customer enters in data obtained from a MICR line of the check, whereby the data includes a one-way hash value that is based on the data provided on the MICR line as well as private data not provided on the MICR line. A web server of an e-tailer for which the customer seeks to make the on-line transaction, receives the data entered by the customer. The web server of the e-tailer transmits, to a check verifier, the data entered by the customer. The check verifier verifies whether or not the check is valid, by comparing the hash code value entered in by the customer with a hash code value that is separately calculated by the check verifier, based on private data of the customer obtained by the check verifier from a database.

4 Claims, 5 Drawing Sheets

U.S. PATENT DOCUMENTS

| | | | | |
|---|---|---|---|---|
| 6,085,168 | A | 7/2000 | Mori et al. | |
| 6,095,413 | A | 8/2000 | Tetro et al. | 235/380 |
| 6,170,744 | B1* | 1/2001 | Lee et al. | 235/380 |
| 6,212,504 | B1 | 4/2001 | Hayosh | |
| 6,611,598 | B1* | 8/2003 | Hayosh | 380/54 |
| 6,654,883 | B1* | 11/2003 | Tatebayashi | 713/168 |
| 6,662,166 | B1* | 12/2003 | Pare et al. | 705/39 |
| 6,760,841 | B1* | 7/2004 | Fernandez | 713/172 |
| 2002/0002674 | A1* | 1/2002 | Grimes et al. | 713/156 |

OTHER PUBLICATIONS

Federal Information Processing Standards Publication, Secure Hash Standard, obtained from http:www.itl.nist.gov/fipspubs/fip 180-1.htm on Apr. 26, 2001, document dated Apr. 17, 1995, pp. 1-19.

Class CRC32, obtained from http:www.java.sun.com/j2se/1.3/docs/apiu/java/util/zip/CRC32.htm, on Apr. 26, 2001, pp. 1-3.

File Verification Using CRC, by M. Nelson (published in Dr. Dobb's Journal, May, 1992), obtained From http:www.dogma.net/markn/articles/crcman/crcman.htm, on Apr. 26, 2001, pp. 1-14.

Draft Fed. Info. Proc. Sheet (FIPS) 46-3, DES, and Request for Comments, obtained from http:www.csrc.ncsl.nist.gov/cryptval/des/fr990115.htm, on Apr. 26, 2001, pp. 1-11.

Data Encryption Standard (DES), Triple DES and Skipjack Algorithm, obtained from http:www.csrc.ncsl.nist.gov/cryptval/des.htm, on Apr. 26, 2001, pp. 1-2.

* cited by examiner

CHECK BASED ONLINE PAYMENT AND VERIFICATION SYSTEM AND METHOD

RELATED APPLICATIONS

This application is related to application Ser. No. 09/859,356, filed May 18, 2001, entitled "Check Authorization System and Method", and application Ser. No. 09/901,124, filed Jul. 10, 2001, entitled "Check Authorization System and Method, by the same inventors as this application. The contents of those related applications are incorporated in their entirety herein by reference.

BACKGROUND OF THE INVENTION

A. Field of the Invention

The invention relates generally to a check based online payment and verification system and method, and more particularly, to a check based online payment and verification system and method for utilizing checks for paying for transactions performed on the Internet.

B. Description of the Related Art

Check authorization and check verification systems and methods are becoming more and more important, since check fraud amounts to billions of dollars lost per year by banks and retail establishments. One such check authorization system is described in U.S. Pat. No. 6,170,744, by Warren S. Lee and William Meadow, which is assigned to Payformance Corporation and which is incorporated in its entirety herein by reference. In the system and method described in U.S. Pat. No. 6,170,744, information is provided on a check by way of a bar code provided on the check, whereby that information is used to verify the check's authenticity.

Such a system requires that the bar code be placed on a portion of the check that is not reserved for other purposes.

Additionally, check based authorization and verification systems are needed for the increasing amount of transactions consummated on the Internet. Currently, the preferred method of payment is via credit card. However, use of credit cards is not particularly good for merchants, since the credit card companies typically take a 3% to 6% fee per transaction. Thus, if a customer buys a $100 item from a merchant, the merchant would only clear $94 after paying the credit card company a 6% fee ($6.00) for the customer's use of a credit card to pay for the transaction. If instead the customer paid cash or used a check, the merchant would not have to pay this overhead to the credit card companies.

Banks also prefer the use of checks instead of other modes of payment, due to their being able to make money off of the "float" of checks as the checks are processed through the Automated Clearing House (ACH) system (which may take several days to complete).

The check authentication described in U.S. Pat. No. 6,170,744 is made by physically scanning the check itself, such as by using a bar code scanner to scan the bar code on the check, in order to obtain the information from the bar code. Thus, authorization or verification of the check at a location different from the point-of-sale location, such as by a web server of a merchant accessible over the Internet, is difficult if not impossible to accomplish utilizing such a scheme.

Accordingly, it is desired to come up with a system and method for using checks as a mode of payment, for transactions performed over the Internet.

SUMMARY OF THE INVENTION

The present invention is directed to a method of verifying a check that is being used for an on-line transaction. The method includes a step of entering in, by a customer using a computer, data obtained from a MICR line of the check, the data including a one-way hash value that is based on the data provided on the MICR line as well as private data not provided on the MICR line. The method also includes a step of receiving, by a web server of a merchant for which the customer seeks to make the on-line transaction, the data entered by the customer, the data being received by way of a computer network. The method further includes a step of transmitting, by the web server of the merchant to a check verifier, the data entered by the customer. The method still further includes a step of verifying, by the check verifier, whether or not the check is valid. The verifying is performed by computing a hash value based on the data entered by the customer, as well as private data of the customer that is obtained from a database accessible by the check verifier.

BRIEF DESCRIPTION OF THE DRAWINGS

The foregoing advantages and features of the invention will become apparent upon reference to the following detailed description and the accompanying drawings, of which.

DETAILED DESCRIPTION OF THE PREFERRED EMBODIMENTS

Preferred embodiments of the invention will be described in detail below, with reference to the accompanying drawings.

The present invention provides a check based online payment and verification system and method, for use for transactions made over the Internet, for example, whereby payment by check is an accepted mode of payment by a merchant conducting business over the Internet (such a merchant is also called an "e-tailer" below).

The present invention helps detect the use of unauthorized or unverified checks for purchasing goods or services over the Internet or some other type of computer network. The present invention maintains a list of check numbers which have been presented for payment and hence prevents the reuse of check numbers. The present invention helps lessen the costs for e-tailers, banks and/or check verification services associated with improperly verifying checks, whereby the dollar amount lost by improperly verifying checks would have to be covered by the retail establishments and/or by banks and/or check verification services that made the improper verification.

The present invention provides for processing each check submitted for verification, and provides for verification of each check presented for an on-line purchase. In order to accomplish this, a one-way hash value is computed in order to obtain an enhanced level of security. The one-way hash value is preferably written onto the MICR line of the check as an n-digit value, when the check is created by a check printing service. The one-way hash value is computed based on input data which includes: 1) customer-specific information, and 2) a key that has been encrypted by a bank or other provider of the key, whereby the key provides an additional level of authentication and fraud deterrence. The key and the encryption of the key are optional features that are a part of the third embodiment described below, and are not part of the first and second embodiments described below.

Figure 1:
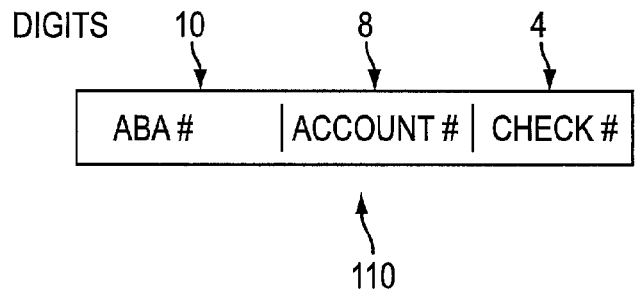
FIG. 1 is a diagram of a standard MICR line on a check.

FIG. 1 shows the format of a MICR line 110 on a standard check. The MICR line is used by banks for check clearance processing. The information provided on the MICR line and the positioning of that information on a check is based on well known specifications MICR specifications. See, for example, Standards for MICR Encoded Documents, Standard 006, obtained from www.cdnpay.ca/eng/rules/006.ENG2.htm#2.20.

For a personal check, the MICR line provides information corresponding to: 1) the ABA number of the bank at which the check is to be debited against (typically the first ten digits on the MICR line), 2) the customer account number at the bank which is to be debited against (typically the next eight digits on the MICR line), and 3) the check number (typically the next four digits on the MICR line). The check number is an optional field on the MICR line 110, but is typically included on personal checks.

For business checks, there also exists an Auxiliary Onus Field on the MICR line, which is typically the first field of the MICR line. The Auxiliary Onus Field typically includes the check number for a business check.

The MICR line has space for an additional 6 digits (more if the check number field is not utilized), whereby this space is currently not utilized on most if not all conventional checks. The present invention makes use of this additional space on the MICR line in order to provide a hash value (preferably 6 digits, but may be of lesser size, such as three to five digits, and may alternatively be of greater size if the MICR line has the available space for it) to be used in check verification.

In the present invention, each check presented for payment, either directly at a point of sale (POS) location or via indirectly an on-line (e.g., Internet) transaction, is uniquely identified by a one-way hash value, which is computed using a hashing algorithm, such as a Cryptographic Hash Algorithm (CHA). The algorithmic techniques employed by the CHA are well known to those skilled in the art. Of course, other types of hashing algorithms may be utilized in order to provide a unique one-way hash value for each check, in accordance with the teachings of the present invention.

In the first embodiment of the invention, the one-way hash value is computed from raw data that includes the ABA number, the customer account number, the check number (if included on the MICR line), the personal customer information (hereinafter referred to as the private data), and a "shared secret" (optional data used in the third embodiment). The personal customer information may be, for example, the last four digits of a checkholder's drivers license number or the last four digits of the checkholder's social security number. Preferably, it is a sequence of digits that can be readily remembered by the customer. One of ordinary skill in the art will recognize that the personal customer information may be any number of digits, such as 3, 4, 5 or 6.

For business checks, the information may be provided to the bearer of the check by an employee of the business, so that the bearer can then provide the private (to the business) information when the check is presented to a bank (or a merchant) for payment.

In the second embodiment of the invention, the n-digit hash value is computed based also on a 1-digit product code (or other sized product code, such as a 2-digit or 3-digit product code in alternative configurations, as will be recognized by those skilled in the art), which is included on the MICR line in the second embodiment to provide additional information to the retail POS (or other entity that is being presented the check for payment or for cashing).

The MICR line information and the computed hash value, but not the private data of the customer or the key, is printed on the MICR line by a check printer when the check is created. The bank where the customer has an account supplies the information needed to generate the hash value to the check printer. When a check created in this manner is presented for payment, this information is obtained at the retail POS by a MICR scanner that is used to scan the check at the retail POS. The customer provides the private data at a retail POS, for example, by presenting his or her driver's license (or by verbally providing the private data) to a cashier (as explained above, for a business check, the checkholder is provided the private data from an employee of the business that has access to the private data). This information is keyed in at the checkout counter by the cashier (or by the customer, if a data entry pad for the customer is provided) and added to the MICR data scanned by the MICR scanner. This data is sent to a verifier/guarantor that verifies the validity of the check.

For on-line transactions, such as ones conducted over the Internet, the customer transmits to the e-tailer's web server the sequence of digits on the MICR line, including the hash digits. A verification of the check is made by a check verifier service provider, which computes a hash value based on the MICR line data entered in by the customer. The check verifier service provider also obtains the private customer data from a database that is accessible by the check verifier service provider. The database may be located at the check verifier service provider, or it may be located separate therefrom, whereby it would be accessible via a secure communications link (e.g., using encryption techniques). Based on the customer-entered MICR line data (minus the hash digits), and the private data of the customer obtained from a database, the check verifier service provider computes a hash value. If the computed hash value matches the hash value entered in by the customer (from the MICR line of the check presented for payment of the on-line transaction), then the check is verified.

Figure 2A:
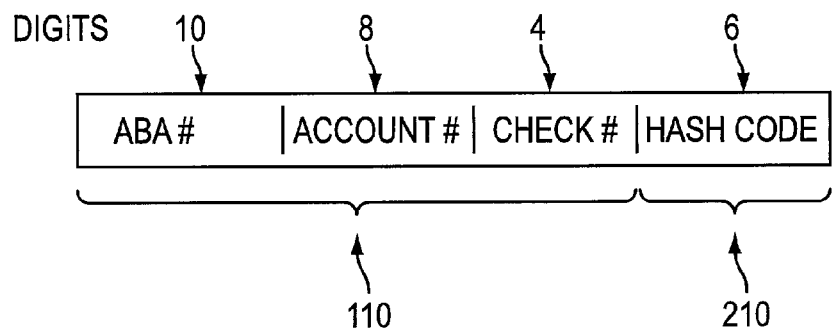
FIG. 2A is a diagram of a MICR line that includes a hash code and that is printed on a check according to a first embodiment of the invention.

FIG. 2A shows the format of a MICR line printed onto a check according to the first embodiment of the invention. Like the MICR line on a standard check, the MICR line printed onto a check according to the preferred embodiment of the invention has a 10-digit ABA number, a 8-digit customer account number, and an optional 4-digit check number (whereby all of this corresponds to the standard MICR line 110 as shown in FIG. 1). In addition, the MICR line on a check according to the first embodiment of the invention also includes a n-digit hash code, which is shown as a 6-digit hash code 210 in FIG. 2A.

Figure 2B:
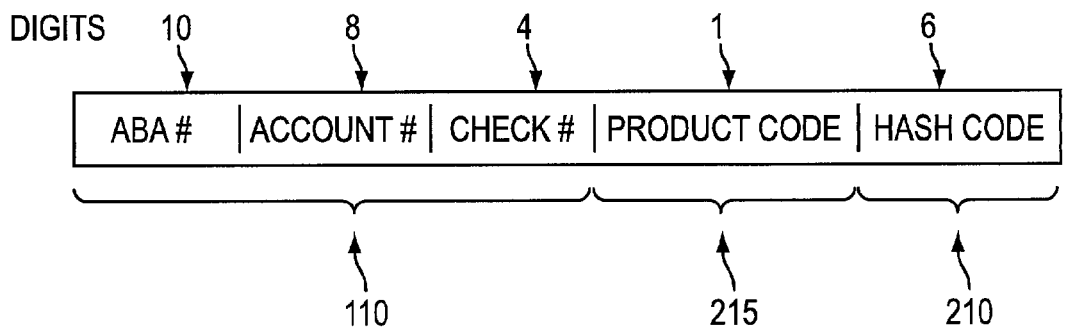
FIG. 2B is a diagram of a MICR line that includes a hash code and a product code that are printed on a check according to a second embodiment of the invention.

FIG. 2B shows the format of a MICR line printed onto a check according to the second embodiment of the invention. Like the MICR line on a standard check, the MICR line printed onto a check according to the preferred embodiment of the invention has a 10-digit ABA number, a 8-digit customer account number, and an optional 4-digit check number (whereby all of this corresponds to the standard MICR line 110 as shown in FIG. 1). In addition, the MICR line on a check according to the second embodiment of the invention also includes a product code 215 and an n-digit hash code 210. The product code 215 is shown as a 1-digit field, but it may be of a larger size to hold more check-related information, if so desired.

By way of the present invention, checks presented for payment of on-line transactions, such as purchases of goods and/or services over the Internet, can be verified. The hash code printed on the MICR line of the check is utilized in this verification process. By way of the present invention, checks that are not verified cannot be used for on-line transactions.

The present invention processes each check presented for payment of an on-line transaction, to provide verification for the check. The present invention can also be used to self-authenticate the validity of the check itself, by requiring that the customer also provide the private data for comparison to the corresponding private data of that customer which is obtained from the database by the check verifier service provider.

As described above, each check is uniquely identified by an m-digit one-way hash value, which is computed by a hash algorithm, such as CHA. The hash value is computed on the raw data comprised of the ABA number, a j-digit customer account number, a k-digit check number, a p-digit product code (used in the second embodiment but not in the first embodiment), and an n-digit personal customer information ("private data") such as the last four digits of the customer's driver's license number or the last four digits of the customer's social security number (j, k, p, and n are integer values). As explained above, this information, except the n-digit private data of the customer, is printed on the MICR line by the check printer. Also, the computed hash value is printed on the MICR line by the check printer.

The bank where the customer has an account supplies the information needed to generate the hash value to the check printer. This information is preferably transmitted by secure means, such as by using a Public Key/Private Key (PPK) methodology, whereby encryption of the data may also be utilized. This information, along with the hash value, is transmitted by the customer to the website at which the customer is conducting an on-line transaction. The customer does not enter in the private data (which is not printed on the check), however. The customer-entered data is sent to a check verifier/guarantor (or check verifier service provider) by a web server, so as to conduct a verification of the check.

The present invention can also retroactively protect checks that have been printed without having a hash code on each check and mailed to the customer. In these cases, an insert card that is preferably sized to fit in a checkbook is printed and mailed to the customer by the check printer. The insert card lists each check number along with the corresponding m-digit hash code for use by the customer when making on-line purchases. When a customer receives a checkbook containing checks with the hash code already printed on them, the customer activates those checks by either calling a particular (e.g., 1-800) phone number or logs on to a particular web site (and enters in personal data to thereby activate the checks), in order to begin to use those checks. Likewise, when a customer receives an insert card, the customer has to activate the checks that the insert card is associated with, before the customer can use those checks for on-line transactions.

Much like a credit card situation where a customer can call a 1-800 number to immediately have the credit card turned off in the even of loss or theft of the card, the customer can access a secure website or call a 1-800 number to have the check or a series of checks immediately canceled in the event of loss or theft of those checks. Upon this notification, information is forwarded to the check verifier service provide, which sets a flag for those checks of the customer, so that those checks cannot be verified under any circumstances.

The present invention provides a way for a customer to use checks for on-line transactions, whereby the customer is responsible for noting (in his/her checkbook) the check amount and date of transaction for the on-line transaction, since the check will not leave the customer's hands. In particular, an electronic ACH will occur as soon as the check is verified, whereby the check will pass through the ACH in the same manner as if it was physically presented to a brick-and-mortar merchant. The customer receives a notification, such as an e-mail (or regular mail) notification, as to the amount that was debited from his/her bank account due to the check being used for the on-line transaction.

Once a check is verified, the check verifier sets a valid/invalid flag to the invalid state for the corresponding check number of the customer, so that the verified check cannot accidentally be used again by the customer for a future on-line transaction or for a future transaction whereby the customer physically presents the check to a brick-and-mortar merchant. Initially, all checks issued to a customer have their valid/invalid flags set to the valid state.

Figure 3:
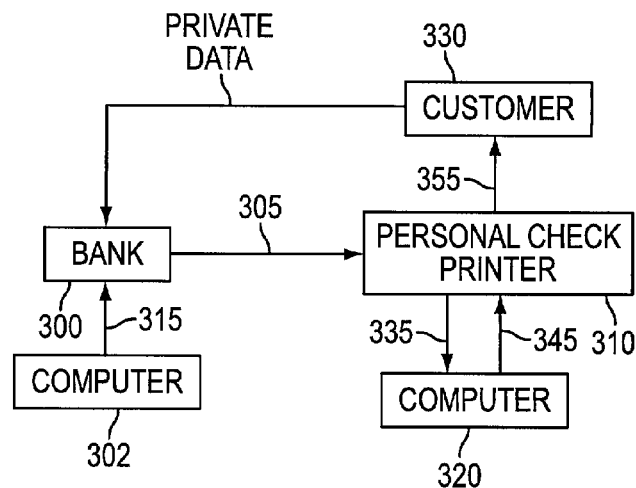
FIG. 3 is a block diagram of the elements utilized in creating a check, according to any of the embodiments of the invention.

FIG. 3 is a block diagram illustrating the process of creating a check according to the invention, from the perspective of a personal check printer. FIG. 3 shows a computer 302, a bank 300, a personal check printer 310, a computer 320, and a customer 330. As a first step, the bank 300 orders checks from the personal check printer 310. The bank 300 sends to the personal check printer 310 the MICR line data, which includes the ABA number of the bank 300, the customer account number, the starting check number (as well as the number of checks to print), and the product code (which appears on the MICR line of a check in accordance with the second embodiment, but which is not included in the MICR line of a check in accordance with the first embodiment). The bank 300 also sends to the personal check printer 310 the private data of the customer 330, as well as check style information. For a business check, the private data is "private' to the business, and is typically provided to the checkholder by an authorized employee of the business.

In a second step, the computer 320, which is to execute the CHA algorithm (to be described in detail below), is passed the raw data.

In a third step, the computer 320, which may be a computer of the check printer 310, generates a one-way, m-digit hash value using the CHA algorithm and the raw data. The raw data includes the ABA number, the customer account number, the check number, the product code (for use in the second embodiment but which is not part of the raw data of the first embodiment), and the private data of the customer 330. This is done for each check to be printed.

In a fourth step, the ABA number, the account number, the check number, the product code (for the second embodiment), and the hash code value are printed on the MICR line of each check printed by the check printer 310. The printed checkbooks are preferably mailed to the customer 330.

In the case where checks already have previously been printed and mailed to the customer 330 without having hash codes on them, the check printer 310 prints an insert card with hash codes for each check that does not have the hash codes printed on the MICR line, whereby the insert card is sent to the customer 330. The use of the insert card will retroactively protect checks that have already been previously printed and mailed to the customer 330.

In a fifth step, upon receiving the checkbook or the insert card, the customer activates the checks, such as by calling a particular phone number (e.g., a 1-800 number) or by accessing a particular Internet website (e.g., www.payformance.com) and entering pertinent data (e.g., the private data of the customer), so as to be able to use the checks for on-line purchases.

A third embodiment of the invention utilizes a key-generating computer 302, which communicates with the bank 300, as shown in FIG. 3.

In the third embodiment, the computer 302 generates a key, which is preferably a Paybond™ shared secret (to be described in more detail below), and provides that shared secret to the bank 300 via communications path 304 (e.g., via mail, via the Internet, via a telephone connection, via a Wide Area Network or WAN). The Paybond™ shared secret is generated at the computer 302 by a cryptographic message digest algorithm, such as the MD5 algorithm or some other suitable digest algorithm. The MD5 Algorithm is known to those skilled in the art, and is described, for example, in "Request for Comments 1321: The MD5 Message-Digest Algorithm", which can be obtained at http://www.cis.ohio-state.edu/cgi-bin/rfc/rfc1321.html.

An important aspect of the invention is the providing of a one-way hash value on each check that is used for check verification and authentication. One-way hashes are utilized in communication systems to prevent what can be thought of as the "digital cloning" of data. One-way hashing is a process whereby a unique fixed length hash value is mathematically generated from the original data of arbitrary length. One-way hashes mathematically ensure that the transformation that produced the unique hash value cannot be used in a reverse process. In addition, a small change in the raw data used to generate the hash results in a change in the hash value (which may be a substantial change, depending on the algorithm used and the numbers input to the algorithm), which can then be used to determine that a check presented for payment is or is not fraudulent.

Figure 4:
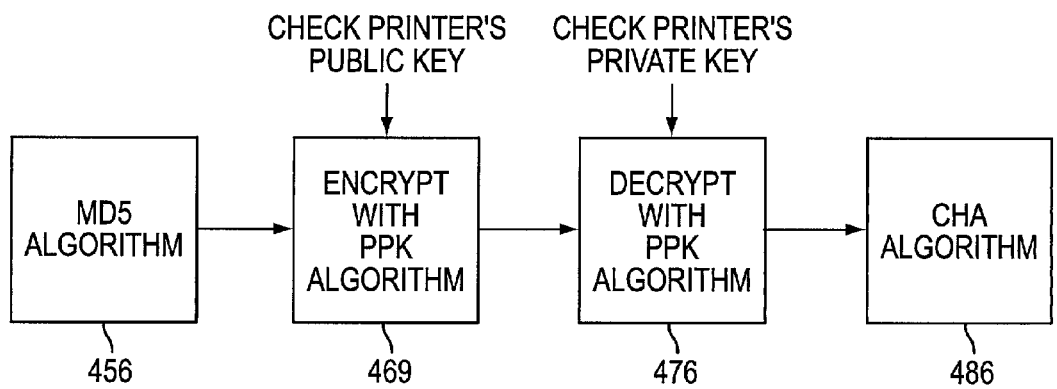
FIG. 4 shows the elements utilized in generating and transmitting a key to be used in the generation of a hash value, according to the third embodiment of the invention.

FIG. 4 is a diagram that illustrates the generation and transmittance of the Paybond™ shared secret from the computer 302 to the check printer 310 (by way of the bank 300), in accordance with the third embodiment. In a first step 456, a 128-bit shared secret (the Paybond™ shared secret) is generated by a message digest algorithm, such as MD5. The generation of the Paybond™ shared secret is done by the computer 302, which can be a computer owned and operated by the bank 300 or which can be a computer owned and operated by a service (e.g., Payformance Corporation) separate from the bank 300. In order to generate the 128-bit shared secret, the MD5 algorithm is applied to some arbitrary data (such as a data file). The MD5 algorithm then creates a 128-bit digest (hash) which is used as the shared secret.

The 128-bit shared secret is transmitted between the bank 300 and the check printer 310 and between the bank 300 and a check verifier service provider in encrypted form by using a secure transmission procedure, such as by using a Public/Private Key (PPK) algorithm or other type of secure transmission/reception scheme. An alternative approach may be to use the Diffie-Helman Key Exchange Algorithm. Both the PPK algorithm and the Diffie-Helman Key Exchange Algorithm are known to those skilled in the art.

A 1024-bit public/private key pair is generated at both the check printer 310 and the check verifier service provider using the PPK algorithm. If a different algorithm is used, the size of the key pair may be different than that given above.

The bank 300 is provided with the public key of both the check printer 300 and the check verifier service provider, while the corresponding private keys are known only to the check printer 310 and the check verifier service provider, respectively.

The 128-bit shared secret generated by the MD5 algorithm is encrypted using the public key of the check printer 310 and transmitted to the check printer 310. Also, the 128-bit shared secret generated by the MD5 algorithm is encrypted using the public key of the check verifier service provider and transmitted to the check verifier service provider. This encryption is shown by step 469 in FIG. 4.

In step 476, the check printer 310 (or the check verifier service provider) then decrypts the 128-bit shared secret at its end using its private key (e.g., its private key). No other entity can decrypt the 128-bit shared secret because only the check printer 310 (or the check verifier service provider) has access to its private key. The 128-bit shared secret serves as an input to the Cryptographic Hash Algorithm (CHA), which is shown as step 486.

Figure 5:
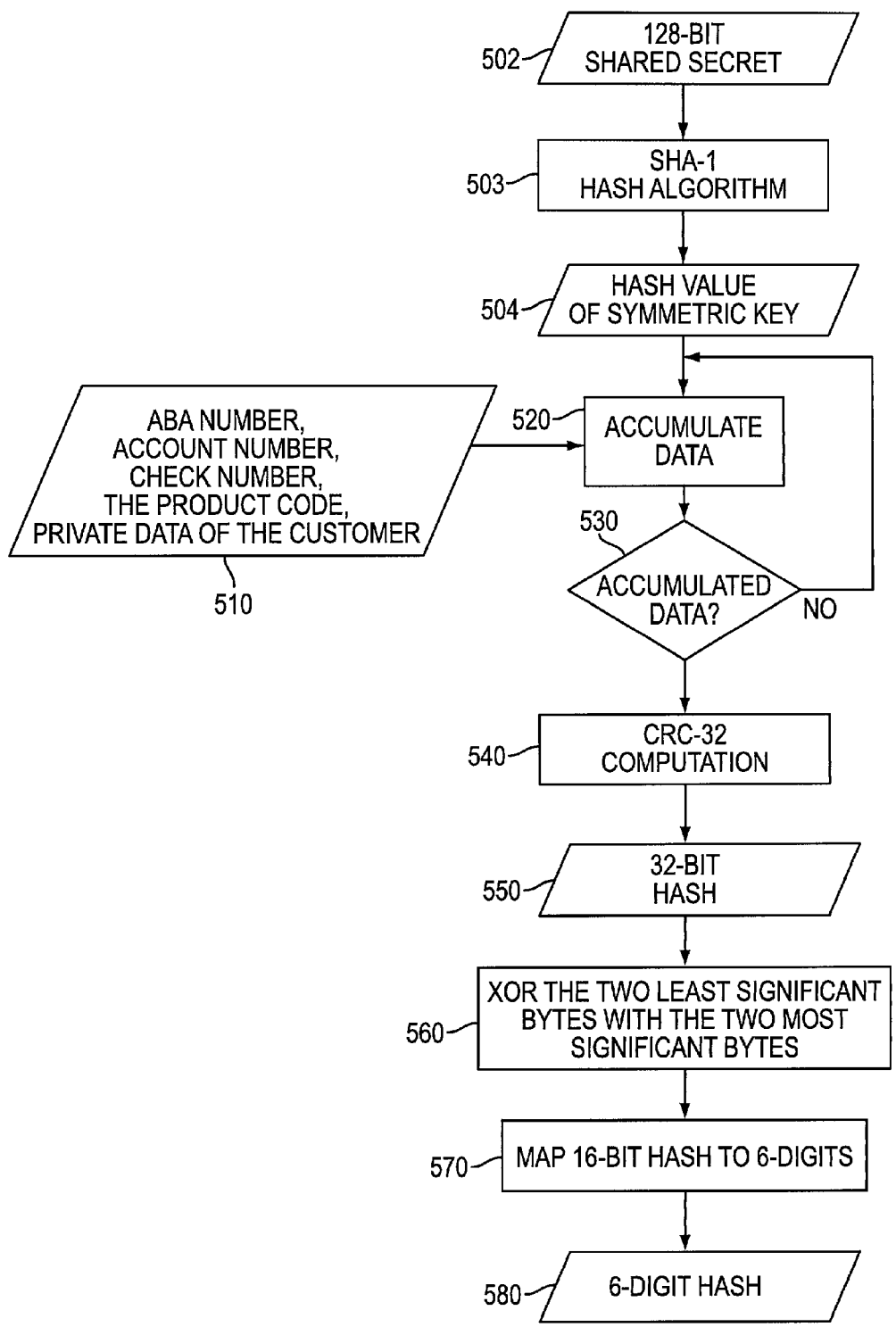
FIG. 5 is a flow chart describing the process for computing a hash value to be printed on each check, according to any of the embodiments of the invention.

FIG. 5 is a flow chart illustrating the actual computation of a one-way hash value by use of CHA. CHA is a well-known hashing algorithm, whereby public information on this hash algorithm may be obtained from the Internet, for example. Steps 502, 503 and 504 of FIG. 5 are utilized in the third embodiment of the invention, but not in the first and second embodiments of the invention (which start their CHA procedure with step 510).

In step 502, the 128-bit shared secret is input to the computer performing the CHA.

In step 503, a SHA-1 hash algorithm is performed on the 128-bit shared secret. SHA-1 is well known to those skilled in the art, and is described, for example, in "Secure Hash Standard", dated Apr. 17, 1995, which is obtainable from the Internet. Of course, other types of hash algorithms besides SHA-1 may be performed, while remaining within the scope of the invention.

As a result of the SHA-1 algorithm performed on the 128-bit Paybond™ shared secret, a 160-bit hash value is obtained in step 504.

In step 510, the ABA number, the customer account number, the check numbers to-be-printed (or just the starting check number and the total number of checks to be printed), and the private data of the customer (for a personal check, whereby private data of a business would be provided for a business check), are provided to the check printer 310 by the bank 300 in the first embodiment. For the second embodiment, the product code data is also provided to the check printer 310.

In step 520, the check printer 310 accumulates the data obtained from step 510 and the 160-bit hash value of the Paybond™ shared secret obtained from step 504 (for the third embodiment that uses the key), so that the accumulated data will be subject to CHA. The data obtained from step 510 may be provided to the check printer 310 by an Internet connection, a WAN, or via the mail, for example. The raw data accumulated in step 520 is preferably stored in a byte array, in a memory (e.g., RAM), at the check printer 310, and is passed to the computer 320 for computing the hash value for the checks to be printed.

In a step 530, a determination is made as to whether or not all of the required data sent to computer 320 by the check printer 310 has been accumulated in byte form (or other type of digital form) by the computer 320. If no, the process returns to step 520, to wait for the remaining data. If yes, the process moves to step 540.

At step 540, an error check computation is performed, which is shown as a CRC-32 computation in FIG. 5. Such an error check computation is well known to those skilled in the art. In the present invention, other types of computations may be performed, other than the CRC-32 computation, to provide the requisite number of hash bits.

At step 550, as a result of the CRC-32 computation at step 540, a 32-bit hash value is generated. Of course, if a different error check computation is performed, a hash value having a different number of bits (e.g., 24 bits, 64 bits) may be obtained at step 550.

At step 560, the 32-bit hash value is decreased in size to obtain a 16-bit hash value. In preferred embodiments of the present invention, the two least significant bytes of the 32-bit hash value are exclusive-or'ed with the two most significant bytes of the 32-bit hash value, in order to obtain a 16-bit hash value. Other ways of decreasing the hash size may be contemplated, such as by exclusive-nor'ing the two least significant bytes and the two most significant bytes with each other, for example.

At step 570, the 16-bit hash value obtained as an output of step 460 is mapped to an n-digit hash value (for example, a 6-digit hash value, so as to be of a size that can be printed onto a MICR line of a check). The mapping for doing this may be by way of a table lookup procedure, such as by converting the 16-bit hash value to its decimal equivalent. For example, 1010111001010001 hash value may be mapped to 127121, by taking each triplet of bits, starting from the least significant bit and working up to the most significant bit, and mapping each triplet of bits to a decimal value. Other ways of mapping from 16-bits to n-digits (where n equals 6 digits for this example) may be contemplated, while remaining within the scope of the invention as described herein. For example, the triplets may be started at the most significant bit, working down to the least significant bit (whereby the last-triplet of bits corresponds to the least significant bit only, as converted to a decimal value). In that case, the computed value would be 534501.

At step 580, an n-digit (for example, a 6-digit) hash value is obtained, which is provided to the check printer 310 by the computer 320, for printing on each check. The n-digit (for example, the 6-digit) hash value will be a unique, non-deterministic value for each check to be printed by the check printer 310, since the check number (if included on the MICR line) is different for each check.

Figure 6:
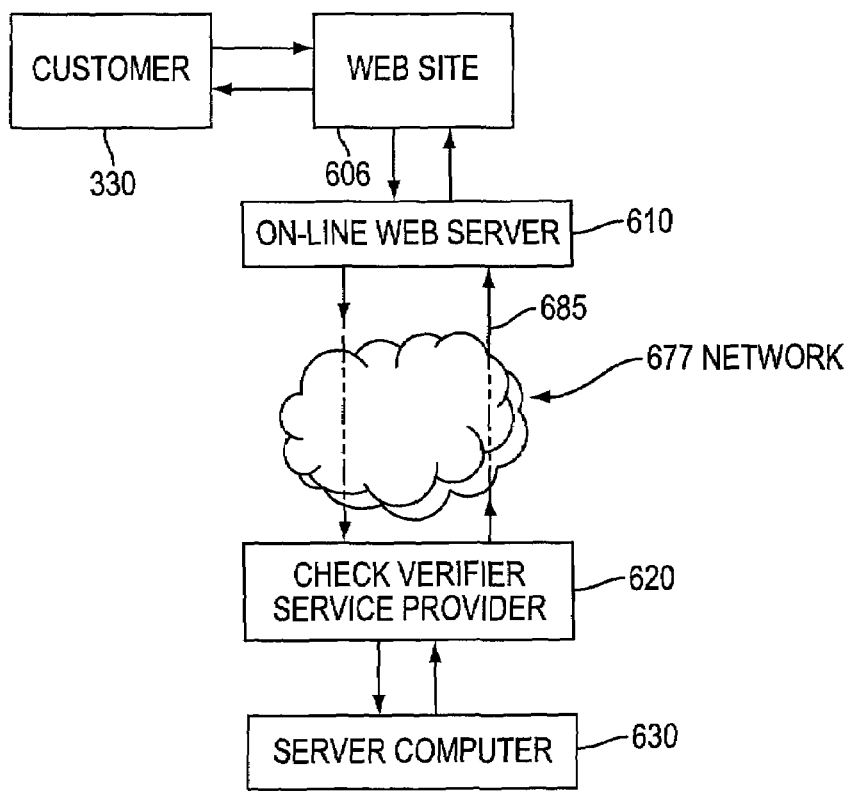
FIG. 6 is a block diagram of the entities involved in a check verification process, according to any of the embodiments of the invention.

FIG. 6 illustrates the elements involved in the interaction between the customer 330, a web site 606 of an e-tailer, an on-line web server 610 (that stores the information of the e-tailer's web site 606 accessed by the customer 330), a check verifier service provider 620, and a server computer 630.

The check verifier service provider 620 may be any one of currently available check verifier service providers, or a new provider of such a service. For example, Telecheck™ currently provides such a service, and it could be utilized as part of the check verification service of the present invention, whereby it's software would have to be modified in order to compute hash codes in a check verification process, in accordance with the present invention.

Figure 8:
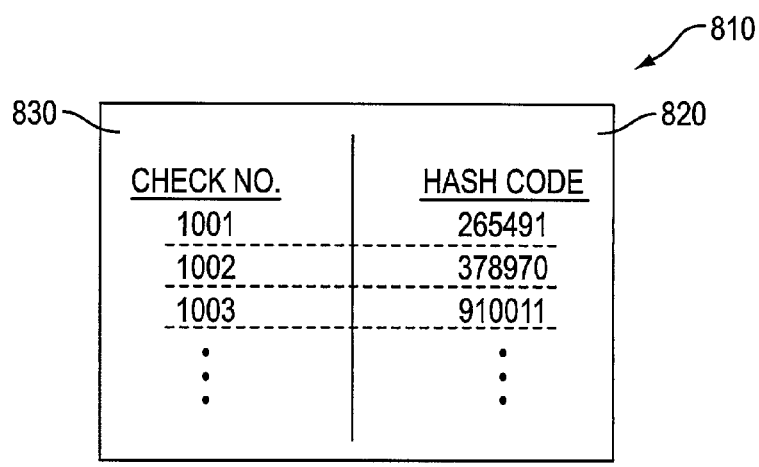
FIG. 8 shows an insert card that may be used for checks without hash values printed thereon, according to any of the embodiments of the invention.

In a first step, the customer 330 selects goods or services for purchase at the on-line web site 606 (e.g., purchase books at Amazon.com). The customer 330 then keys in (by way of his/her computer keyboard) the ABA number, account number, check number and product code (if included on the check as in accordance with the second embodiment) printed on the MICR line of his/her check. The customer 330 also keys in the m-digit hash code (for example, the 6-digit hash code generated by the CHA algorithm) for that check by looking it up on the MICR line of the check or by looking it up on the insert card provided to the customer by the check printer (see FIG. 8, which shows an insert card 810 that has a column 820 with hash codes and a column 830 with corresponding check numbers). For ease in doing this, the customer may be provided with a template from either the bank or from the check printer, which can be placed over the check to provide clear indications to the customer 330 as to which values on the MICR line correspond to which information.

Figure 9:
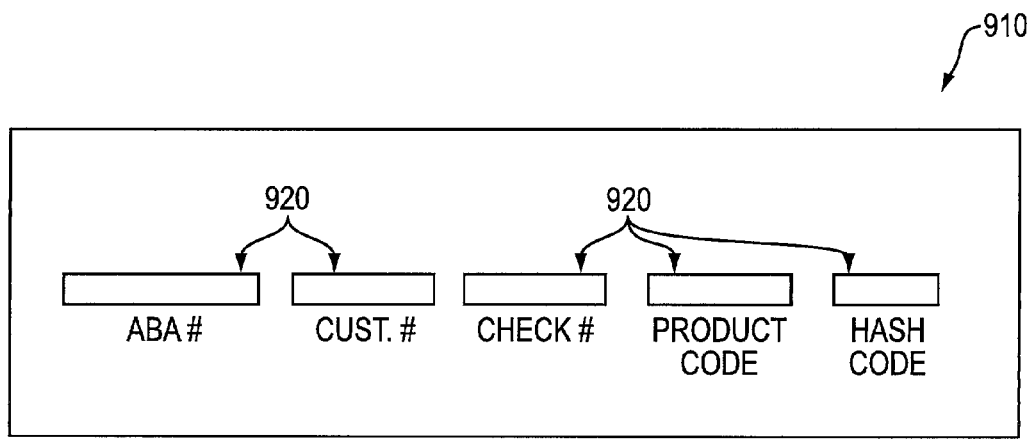
FIG. 9 shows a template that may be used by a customer to read and then enter, via a computer keyboard or the like, data to be sent over the Internet, according to any of the embodiments of the invention.

FIG. 9 shows a template 910 which may be utilized with the present invention. The template 910 is sized the same as a check, and has openings 920 for the ABA number, the customer account number, the check number, the product code, and the hash code value for a check printed in accordance with the present invention. When the template 910 is placed directly over a check, the corresponding data on the MICR line appears, so that the customer can determine which data corresponds to which information to be entered on-line via a computer keyboard or the like, when conducting an on-line transaction in accordance with the present invention.

In a second step, the data keyed in by the customer 330 is transferred to the on-line web site 606 via an Internet connection and thereby provided to the on-line web server 610, which reads and processes information sent to the on-line web site 606.

In a third step, the on-line web server 610 transmits the hash code and other data keyed in by the customer 330 over a network 677 (for example, this network may be a Virtual Private Network, VPN, or the Internet) to the check verifier service provider 620.

In a fourth step, the server computer 630 (of the check verifier service. provider, in a preferred implementation) computes a one-way hash using the CHA, using the data keyed in by the customer 330 and the customer's private data that is obtained from a database accessible by the server computer 630. For the third embodiment, a shared secret previously obtained by the check verifier service provider 620 (where that shared secret value is assigned to the customer or account corresponding to the check presented for verification) is used in the computation of the hash value by the check verifier service provider 620. For the first and second embodiments, a shared secret value is not utilized in the hash value computation process.

In a fifth step, if the computed hash value matches the hash value keyed in by the customer 330, the transaction is approved, and the check verifier service provider 620 responds with a transaction approval code. If the hash values do not match, then a transaction disapproval code is output by the check verifier service provider 620.

In a sixth step, the transaction approval code or transaction disapproval code is returned to the on-line web server 610 (via the network 677), whereby the on-line web server 610 updates the e-tailer's web site 606 accordingly. The customer 330 is notified as to whether his/her check has been approved or disapproved, via the Internet (that is, it may be the same network as network 677 in FIG. 6).

In a fourth embodiment, the e-tailer may require that the customer 330 enter in his/her private data (for example, the last 4 digits of his/her driver's license or social security number) along with the data listed in the first step described above. This will enable the check verifier service provider 620 to verify not only the check itself but also authenticate the identity of the customer 330. As an incentive for doing this, the e-tailer may choose to offer free shipping to the user who provides his/her private data on-line, for example.

In the second embodiment, a product code field is also included on the MICR line. The product code is a field of digits (e.g., 1 or 2 digit field, for example) that conveys more information on the check and the account on which the check is to be drawn against. For example, Product Code=0 signifies that the account in question is not sufficient funds (NSF) protected, Product Code=1 signifies that the check is authorized up to a maximum of $1,000, Product Code=2 signifies that the check is authorized up to a maximum of $10,000, and Product Code=4 signifies the type of data required (e.g., social security number, or driver's license number).

The check verifier service provider 620 is also provided with the amount of the on-line transaction subject to verification, and uses the information in the product code field when determining whether or not to authorize the check for the on-line transaction. In the first embodiment, whereby product code data is not used in the check verification, the e-tailer determines on its own whether or not to authorize a "verified" check for a particular dollar amount.

The providing of the check authorized/not authorized information and/or the (decoded) product code information is shown by way of communications path 685 in FIG. 6, which is sent over Network 677.

Figure 7:
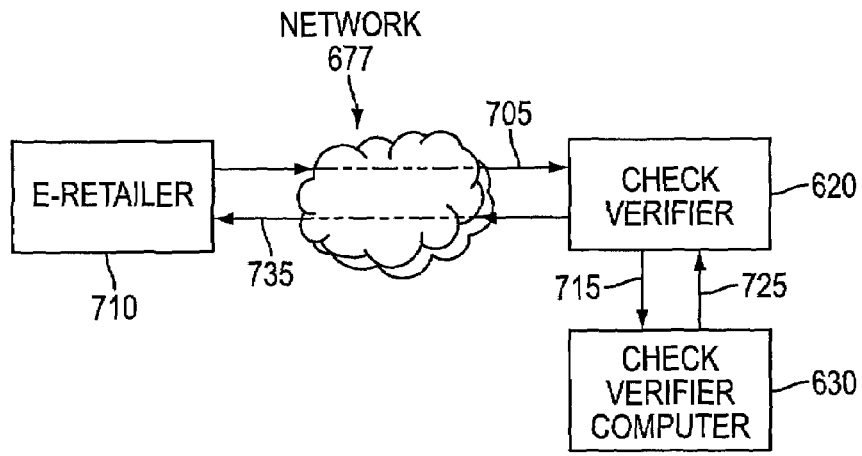
FIG. 7 is a block diagram of the entities involved in a check verification process from the perspective of a check verifier service provider, according to any of the embodiments of the invention.

FIG. 7 illustrates the check verification process for the various described embodiments of the invention from the perspective of the check verifier service provider 620.

In a first step, the e-tailer 710 transmits the data keyed in by the customer 330 which is received by the e-tailer 710 from its on-line web server (see FIG. 6, for example), to the check verifier service provider 620, as shown by communications path 705. This transmission of data is made over Network 677 (e.g., Internet, a WAN, etc.). The program that implements the CHA algorithm (or other type of hashing algorithm used) is preferably stored in memory that is accessible by the check verifier computer 630.

The raw data is passed to the check verifier computer 630 from the check verifier service provider 620, as shown by communications path 715.

The check verifier computer 630 uses the raw data comprising the ABA number, the customer account number, the check number (if included as part of the MICR line), the private data of the customer (or the private data of a business for a business check) as obtained from a database accessible by the check verifier computer 630. The PayBond™ shared secret (which the check verifier service provider 620 has previously received from the bank 300) is also provided in the third embodiment. The check verifier service provider 620 generates the one-way hash value using this data and the executable code stored in its memory. It then compares the computed hash value with the hash value transmitted by the e-tailer (transmitted to the e-tailer's web server via an Internet connection) to the check verifier service provider 620. If there is a match, the check is verified. The status of the check is returned to the check verifier service provider 620, as shown by communications path 725. In addition, the check verifier computer 630 also maintains a list of check numbers which have been presented for payment and hence prevents the reuse of check numbers.

The check verifier service provider 620 then returns the status of the check verification process along with the message appropriate to the product code to the retail e-tailer, as shown by communications path 735. This passage of data is made over Network 677. As explained earlier, other information besides check authorized/not-authorized, such as a specific dollar cap for the check, whether the check is NSF or overdraft protected, etc., may be provided as well to the e-tailer, based on the information in the product code field that is included on the MICR line in the second embodiment. Based on the information provided to it from the check verifier service provider 620, the e-tailer 710 either accepts the check or rejects the check.

Thus, a system and method has been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

For example, the location of the hash code (and the product code in the second embodiment) on the MICR line may be different from that shown in FIGS. 2A and 2B. For example, the hash code would typically be provided on the right side of the MICR line (next to check number) for a personal check, and the hash code would typically be provided on the left side of the MICR line (next to ABA number) for a business check. This placement of the hash code on the MICR line is based on the current specifications for the MICR line, and may be changed to include other locations if the MICR line specifications are modified in the future.

Additionally, while the present invention has been described with respect to personal checks and business checks, it is also applicable to other modes of payment, such as traveler's checks, money orders, or cashier's checks, which may be presented for payment of an on-line transaction.

It is envisioned that the fee for providing such checks with hash values and for verifying such checks with hash values will be less than the amount currently charged by credit card companies for authorizing credit cards. For example, a 0.9% fee per transaction may be assessed, which makes such a system and method attractive to e-tailers and to banks.

What is claimed is:

1. A method for verifying a check that is being used for an on-line transaction, comprising: entering in by a customer using a computer, data obtained from a MICR line of the check, the data including a one-way hash value that is based on the data provided on the MICR line as well as private data not provided on a face of the check, the private data being a numerical value previously provided by the customer and that is stored in a database accessible by a check verifier; receiving by a web server of a merchant for which the customer seeks to make the on-line transaction, the data entered by the customers the data being received by way of a computer network; transmitting by the web server of the merchant to the check verifier by way of the computer network the data entered by the customer; and verifying by the check verifier whether or not the check is valid wherein the verifying is performed by the check verifier computing a hash value based on the data entered by the customer and provided to it by the web server as well as private data of the customer that is obtained from the database accessible by the check verifier; wherein the one-way hash value is included as an n-digit field at one end of the MICR line, n being an integer greater than one.

2. A method for verifying a check that is being used for an on-line transaction, comprising: entering in by a customer using a computer, data obtained from a MICR line of the check, the data including a one-way hash value that is based on the data provided on the MICR line as well as private data not provided on a face of the check, the private data being a numerical value previously provided by the customer and that is stored in a database accessible by a check verifier; receiving by a web server of a merchant for which the customer seeks to make the on-line transaction, the data entered by the customers the data being received by way of a computer network; transmitting by the web server of the merchant to the check verifier by way of the computer network the data entered by the customer; and verifying by the check verifier, whether or not the check is valid wherein the verifying is performed by the check verifier computing a hash value based on the data entered by the customer and provided to it by the web server, as well as private data of the customer that is obtained from the database accessible by the check verifier wherein the entering in step includes entering in the private data by the customer, wherein the check verifier verifies the check based on the computed hash value, and the check verifier authenticates the customer by comparing the private data entered by the customer with the private data obtained from the database, to determine if there is a match.

3. A system for verifying a check that is being used for an on-line transaction made over a computer network, comprising: an input unit for receiving, from a customer, MICR data obtained from a MICR line of the check and private data of the customer, the MICR data including first MICR data that corresponds to bank account information and second MICR data that includes a one-way hash value that is computed based on the first MICR data and the private data of the customer that is not provided on a face of the check, the private data being a numerical value previously provided by the customer and that is stored in a database accessible by a check verifier; a web server for receiving the MICR data and the private data from the input unit, as well as transaction data corresponding to a desired on-line transaction to be made by the customer, the MICR data and the private data and the transaction data being received by the web server by way of the computer network; and the check verifier for receiving, by way of the computer network as output by the web server, the private data provided by the customer via the input unit and the MICR data provided by the customer via the input unit, wherein the check verifier verifies the check based on the computed hash value, and the check verifier authenticates the customer by comparing the private data entered by the customer via the input unit and provided to the check verifier by the web server, with the private data obtained by the check verifier directly from the database, to determine if there is a match.

4. The system according to claim 3, wherein the check verifier verifies the check when the hash value computed by the check verifier matches the second MICR data.

* * * * *